G. H. ALLDEN.
TREAD BAND FOR PNEUMATIC TIRES.
APPLICATION FILED MAY 14, 1921.

1,425,356.

Patented Aug. 8, 1922.

INVENTOR
George H. Allden.

By James L. Norris
Attorney

UNITED STATES PATENT OFFICE.

GEORGE HENRY ALLDEN, OF FOLKESTONE, ENGLAND.

TREAD BAND FOR PNEUMATIC TIRES.

1,425,356.  Specification of Letters Patent.  Patented Aug. 8, 1922.

Application filed May 14, 1921. Serial No. 469,470.

*To all whom it may concern:*

Be it known that I, GEORGE HENRY ALLDEN, M. B., M. S., a subject of the King of Great Britain, residing at Folkestone, Kent, England, have invented new and useful Improvements in or Relating to Tread Bands for Pneumatic Tires, of which the following is a specification.

This invention relates to tread bands for pneumatic tires.

My invention is of the kind wherein there are provided inter-engaging V-shaped projections and depressions on the tread band and tire cover, the arms of the V's being in some cases unjoined and being formed at their ends with lateral perpendicular interengaging surfaces to enable the tread band to resist lateral stresses.

According to my invention, the V-shaped projections are arranged in combination with circumferential substantially perpendicular surfaces arranged at the sides of the tread band, such surfaces facing each other and engaging corresponding lateral circumferential surfaces on the tire cover. Moreover a reinforcing band of non-elastic material is incorporated with the tread band adjacent to the V-shaped projections. By this means, a very effective resistance is offered to lateral displacement of the tread band in addition to offering resistance to motion of the tread band circumferentially on the cover.

In the accompanying drawing, I have shown how my said invention may be conveniently and advantageously carried into practice. In this drawing:—

Figure 1:
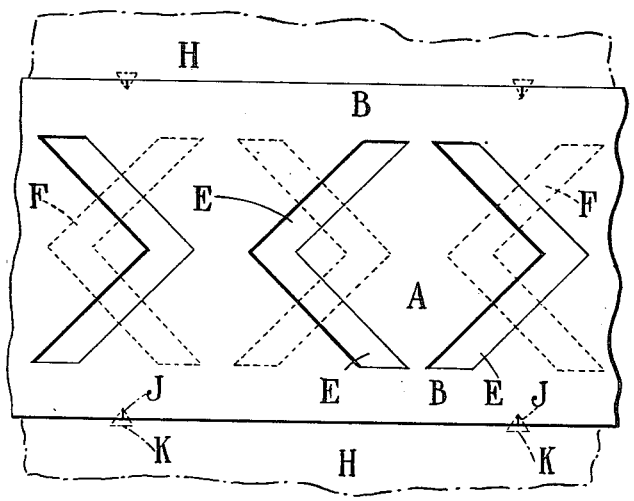
Figure 1 is a plan.
Figure 2:
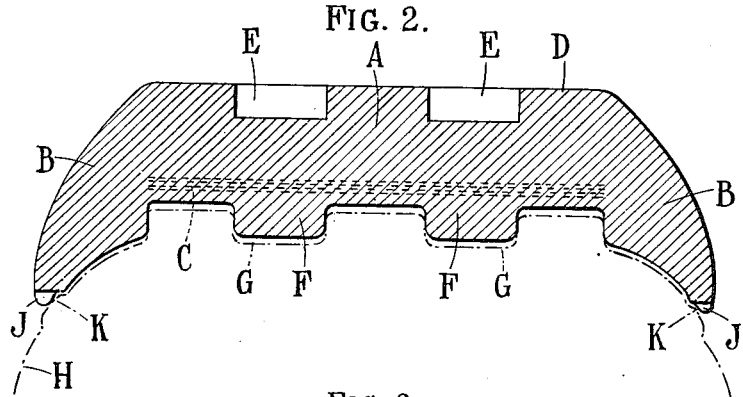
Figure 2 is a transverse section of a tread band constructed as one example according to my invention.

Referring first to Figures 1 and 2, the tread band is made in any suitable known manner of vulcanized india rubber A, with lateral lips B, B which are made sufficiently elastic to permit of the band being levered into position on the tread of the tire when the latter is deflated. In the body of the tread there is vulcanized a reinforcing band C formed of a number of plies of strong canvas. The periphery or tread surface D of the tread band is provided with a series of V-shaped depressions E, E, for forming a non-skid surface.

On the inner side of the tread band there is formed a series of V-shaped projections F, F, which are arranged in pairs symmetrically about the centre line of the band with the angles facing each other as shown in Figure 1. These projections are preferably arranged oppositely to the depressions E, E of corresponding form on the outside of the band lying immediately above them, as indicated in full and dotted lines in Figure 1. The edges of the projections F, F are preferably rounded, as shown in Figure 2, so as to facilitate their entrance into the depressions G, G of corresponding shape in the tread surface of the tire cover H.

In order to enable it to be determined when the projections F, F and depressions G, G are in register with each other, marks J, J are formed on the edges of the lips B, B, these marks being adapted to come into register with marks K, K on the tire cover when the projections F, F are in engagement with the depressions G, G.

Figure 3:
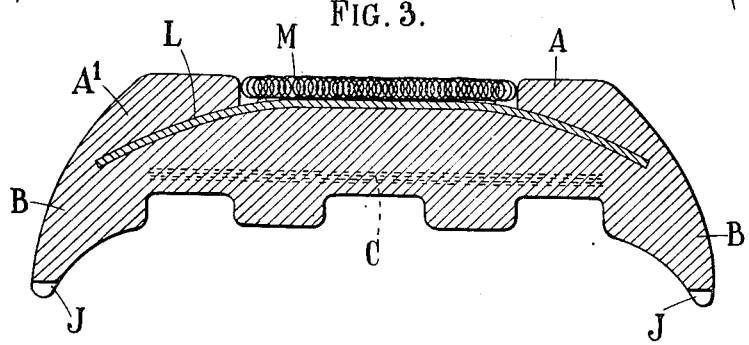
Figure 3 is a similar section illustrating a modification.

In Figure 3, I have shown a modification wherein a shield L of leather, canvas or other suitable material is vulcanized into the tread band A' above the reinforcing band C, and is provided with steel chain armour M for engaging with the road surface.

The tread of the tread-band can moreover be provided with steel studs or other armour secured, e. g. to a shield such as L, or arranged in any other suitable manner. The rubber of the tread band may also be reinforced by materials such as cotton, cord, fibre, linen, asbestos, iron filings, or the like. It may be moulded to any desired pattern externally; and the interior surface can be made with projections or depressions to correspond with the depressions or projections on the outer surfaces of existing tire-covers, provided that such surfaces afford sufficient abutment for resisting lateral and circumferential slip of the tread band relatively to the tire cover, when the tire is inflated.

I claim:—

1. The combination in a pneumatic tire, of a cover and a tread band, said cover and tread band having interengaging projections and depressions, which are of V-shape and are separate from each other and comprise lateral surfaces lying in planes perpendicular to the axis of the tire, a reinforcing band of non-elastic material incorporated circumferentially in the tread band, the tread band having continuous lateral circumferential surfaces, which face inwardly and lie in planes substantially perpendicular to the axis of the tire, and the cover having continuous circumferential surfaces corresponding to and engaging with the circumferential surfaces on the tread band.

2. The combination, in a pneumatic tire, of a cover and a tread band, said cover and tread band having interengaging projections and depressions which are separate from each other and are of V-shape with the open ends of the V's facing alternately in opposite directions along the circumference of the tire, such projections and depressions also comprising lateral surfaces lying in planes perpendicular to the axis of the tire, a reinforcing band of non-elastic material incorporated circumferentially in the tread band, the tread band having continuous lateral circumferential surfaces facing inwardly and lying in planes substantially perpendicular to the axis of the tire, and the cover having continuous circumferential surfaces corresponding to and engaging with the circumferential surfaces on the tread band.

3. The combination in a pneumatic tire, of a cover and a tread band having interengaging projections and depressions, which are of V-shape, and are separate from each other and comprise lateral surfaces lying in planes perpendicular to the axis of the tire, a reinforcing band of non-elastic material incorporated circumferentially in the tread band, the tread band having continuous lateral circumferential surfaces facing inwardly and lying in planes substantially perpendicular to the axis of the tire, and the cover having continuous circumferential surfaces corresponding to and engaging with the circumferential surfaces on the tread band, said tread band and tire cover being provided, respectively, with marks registering with each other when the interengaging projections and depressions are in register with each other.

GEORGE HENRY ALLDEN.

Witnesses:
GEORGE HARRISON,
JOHN T. KNOWLES.